United States Patent [19]
Wakamatsu et al.

[11] Patent Number: 5,765,918
[45] Date of Patent: Jun. 16, 1998

[54] HEADREST DEVICE

[75] Inventors: Fumio Wakamatsu, Okazaki; Nobuhiko Takeda, Obu, both of Japan

[73] Assignee: Aisin Seiki Kabushiki Kaisha, Japan

[21] Appl. No.: 724,114

[22] Filed: Aug. 13, 1996

Related U.S. Application Data

[63] Continuation of Ser. No. 389,879, Feb. 17, 1995, abandoned.

[30] Foreign Application Priority Data

Feb. 23, 1994 [JP] Japan .................. 6-025368

[51] Int. Cl.$^6$ .................................................. A47C 7/48
[52] U.S. Cl. .................... 297/408; 297/399; 464/37
[58] Field of Search .............................. 297/374, 408, 297/397, 404, 396, 399; 403/411.38, 83, 84, 120; 464/37; 74/527

[56] References Cited

U.S. PATENT DOCUMENTS

| | | | |
|---|---|---|---|
| 3,537,750 | 11/1970 | Lohr | 297/397 |
| 3,695,669 | 10/1972 | Mertens | 297/408 |
| 3,911,757 | 10/1975 | Rix et al. | 74/427 |
| 4,304,439 | 12/1981 | Terada et al. | 297/408 X |
| 4,312,538 | 1/1982 | Kennedy et al. | 297/408 |
| 4,566,570 | 1/1986 | Geisthoff | 464/37 |
| 4,674,797 | 6/1987 | Tateyama | 297/408 |
| 4,878,880 | 11/1989 | Williams | 464/37 |
| 4,991,907 | 2/1991 | Tanaka | 297/404 X |
| 5,150,851 | 9/1992 | Manusch et al. | 464/37 X |
| 5,290,091 | 3/1994 | Dellanno et al. | 297/391 |
| 5,328,244 | 7/1994 | Ishihara et al. | 297/397 X |
| 5,695,699 | 12/1997 | Mertens | 297/408 |

FOREIGN PATENT DOCUMENTS

| | | | |
|---|---|---|---|
| 2911321 | 9/1979 | Germany | 297/408 |
| 57-45 | 1/1982 | Japan . | |
| 4-14045 | 3/1992 | Japan . | |
| 5-9870 | 3/1993 | Japan . | |

*Primary Examiner*—Peter M. Cuomo
*Assistant Examiner*—Stephen Vu
*Attorney, Agent, or Firm*—Finnegan, Henderson, Farabow, Garrett & Dunner, L.L.P.

[57] ABSTRACT

A headrest device includes a stay fixed to a seat back, a headrest body supported on the stay so as to be able to rotate around the stay, and a resistance adding member for increasing the resistance to the rotation of the headrest body relative to the stay, the member includes a plurality of projections provided on the stay, and a plurality of concave portions provided on the headrest body so as to be able to be elastically deformed whereby each of the projections is in frictional engagement with each of the concave portions.

3 Claims, 5 Drawing Sheets

5,765,918

HEADREST DEVICE

This application is a continuation of U.S. patent application Ser. No. 08/389,879 filed Feb. 17, 1995, now abandoned.

BACKGROUND OF THE INVENTION

1. Field of the Invention

The present invention relates to a headrest device for use in an automotive vehicle.

2. Description of the Related Art

A conventional headrest device is disclosed in a Japanese utility model publication No. 4 (1992)-14045 after examination.

The foregoing headrest device comprises a stay fixed to a seat back and a headrest body supported on the stay so as to be able to rotate around the stay relative to the stay. The stay has a pair of vertical portions and a horizontal portion connecting the upper portions of the vertical portions to each other. The headrest body has a friction member made of synthetic resin and a frame fixed to the friction member.

The friction member has a hole into which the horizontal portion of the stay is pressed. The diameter of the hole is smaller than a diameter of the horizontal portion of the stay. Therefore, frictional resistance is added to the rotation of the head rest body relative to the stay. In other words, the material defining the hole provides the added resistance. This added resistance can prevent an unexpected rotation of the headrest body.

However, in the above described headrest device, since the horizontal portion of the stay is pressed into the hole, the diameter of which is smaller than the diameter of the horizontal portion, there is the following drawback.

Both the step of molding the friction member and the step of pressing the horizontal portion of the stay into the hole are necessary in order to manufacture the head rest device. Thus, since at least two steps are necessary in order to manufacture the headrest device, the manufacturing time of the head rest device is increased.

If the friction member is assembled to the horizontal portion of the stay at the same time that the friction member is molded by using insert molding, the diameter of the hole is substantially equal to the diameter of the horizontal portion of the stay. As a result, the frictional resistance is not added to the rotation of the headrest body relative to the stay, so that the unexpected rotation of the headrest body can not be prevented.

SUMMARY OF THE INVENTION

It is, therefore, an object of the present invention to provide a head rest device which overcomes the drawback of the prior art.

The above object is achieved by a headrest device including a stay fixed to a seat back, a headrest body supported on the stay so as to be able to rotate around the stay, and resistance adding means for adding the resistance to the rotation of the headrest body relative to the stay, said means including a plurality of projections and a plurality of concave portions provided on the stay and the headrest body, capable of being elastically deformed whereby the projections and the concave portions are in engagement with one another.

BRIEF DESCRIPTION OF THE DRAWINGS

Additional objects and advantage of the present invention will become more apparent from the following detailed description of a preferred embodiment thereof when considered with reference to the attached drawings, in which.

DETAILED DESCRIPTION OF THE PREFERRED EMBODIMENTS

Hereinafter a headrest device according to one embodiment of the present invention is described with reference to FIGS. 1 through 5.

Figure 1:
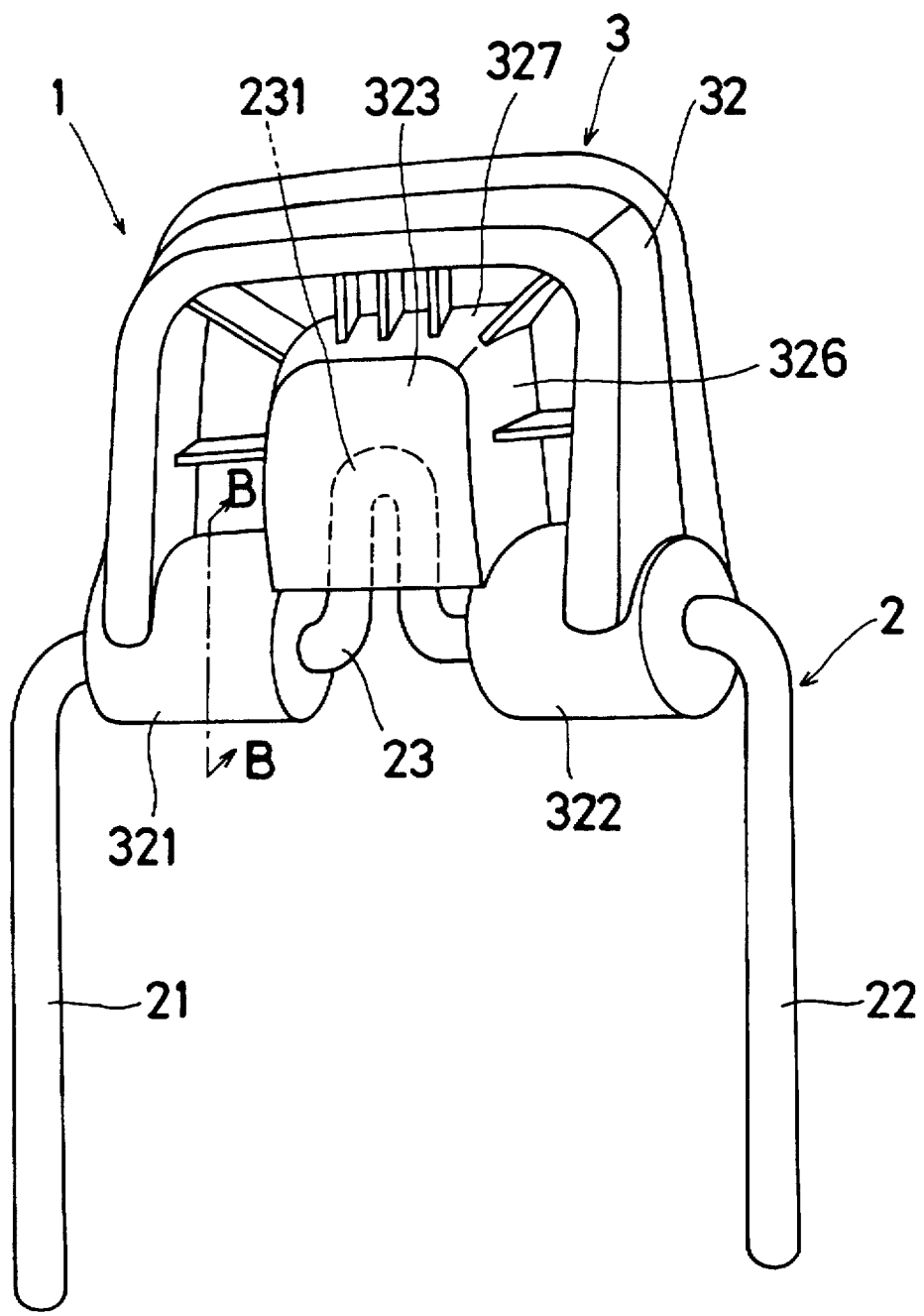
FIG. 1 is a perspective view of the front portion of a headrest device according to one embodiment of the present invention.

As shown in FIG. 1, a headrest device 1 indicates a stay 2 and a headrest body 3. The stay 2 has a pair of spaced vertical portions 21 and 22 and a horizontal portion 23 connecting the vertical portions 21 and 22 to each other. The vertical portions 21 and 22 are fixed to a seat back (not shown).

An extending bent portion 231, which may have an inverted U-shaped configuration, extends from a center portion of the horizontal portion 23 in the upward direction, as viewed in the drawings.

Figure 2:
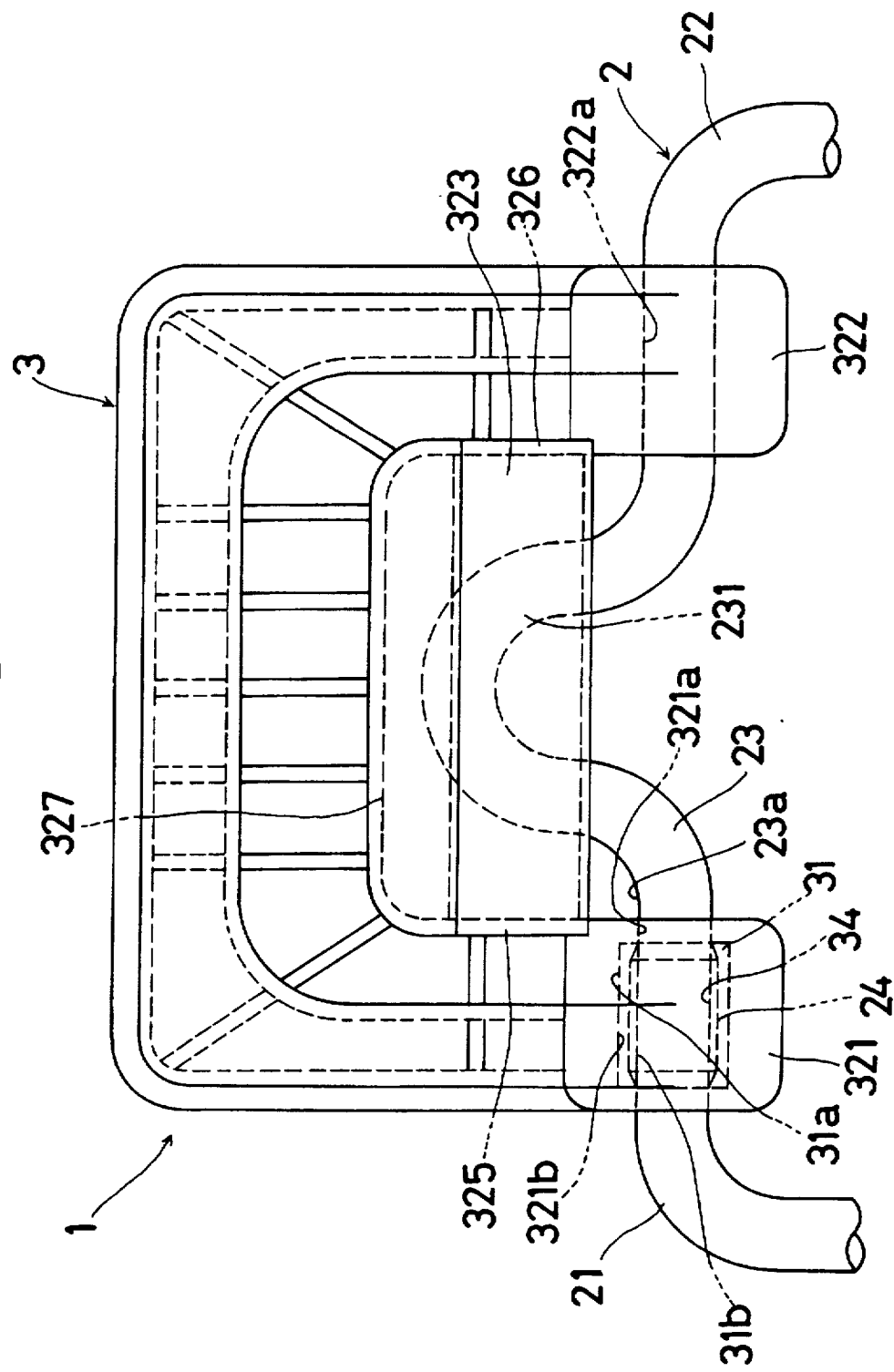
FIG. 2 is an enlarged view in elevation of the headrest device shown in FIG. 1.
Figure 3:
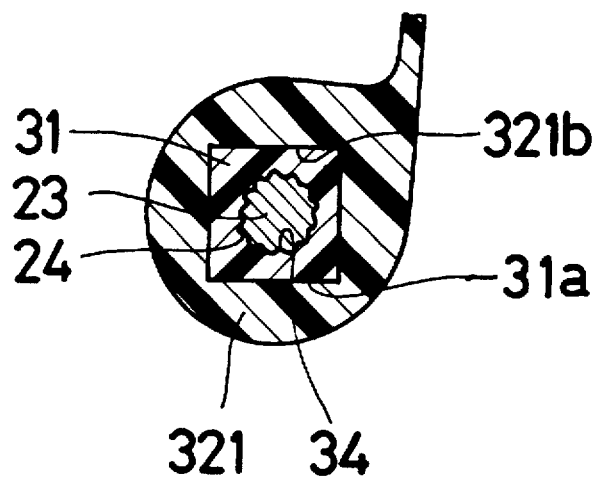
FIG. 3 is a cross-sectional view taken along line 3—3 of FIG. 1.

As shown in FIG. 2 and FIG. 3, a plurality of circumferentially spaced projections (hereinafter referred to as the projections) 24 are provided on an outer face 23a of the horizontal portion 23 so as to be located between the vertical portion 21 and the extending portion 231. Each of the projections 24 extends in a lengthwise direction along the axis of the horizontal portion 23 within a predetermined range. As shown in FIG. 3, the projections 24 are equally spaced around the circumference of the horizontal portion 23. Each of the projections 24 may be configured in the form of a serration or have a random shape.

The headrest body 3 has an elastic body member 31, a frame 32 and a pad 33. The elastic body member 31 is formed on the outer surface 23a of the horizontal portion 23 so as to cover the projections 24. The elastic body member 31 is made of elastic material such as soft resin, rubber, etc. The body member 31 is in the form of a block that is square in cross section, and has four rectangular sides, each of which constitute an outer face 31a.

As shown in FIG. 3, a plurality of circumferentially spaced concaves (hereinafter referred to as the concaves) 34 are provided on an inner face 31b of the elastic body 31 so as to receive and engage the projections 24 formed on the stay 2. Each of the concaves 34 extends in the same axial direction as the projections 24 and within the same range as the projections 24. As shown in FIG. 3, the concaves 34 are equally spaced around the inner circumferential surface of the body member 31. Each of the concaves 34 may be in the form of a serration or have a random shape.

A resistance adding means for adding resistance to rotation of the headrest body 3 relative to the stay 2 comprises both projections 24 and concaves 34. Although in the illustrated embodiment, the resistance adding assembly 24 and 34 is provided between the vertical portion 21 and the extending portion 231 of the stay 2, in the alternative, it may be provided between the vertical portion 22 and the extending portion 231. Also, it may be provided between the vertical portion 22 and the extending portion 231 as well as between the vertical portion 21 and the extending portion 231.

Although in the illustrated embodiment, the projections 24 are provided on the horizontal portion 23 and the concaves 34 are provided on the elastic body member 31, the projections 24 may be provided on the elastic body member 31 and the concaves 34 may be provided on the horizontal portion 23. Additionally, a plurality of first projections and concaves may be provided on the horizontal portion 23 and a second plurality of projections and concaves may be provided on the elastic body 31.

The frame 32 is made of hard resin and reinforces the headrest body 3. The frame is supported on the horizontal portion 23 of the stay 2 so as to be able to rotate around and relative to the horizontal portion 23. The frame 32 has a first support portion 321, a second support portion 322, a front side wall 323, a rear side wall 324, a right side wall 325, a left side wall 326, and a top wall 327.

The first support portion 321 covers and surrounds the elastic body member 31 so as to be in contact with all surfaces of the elastic body member 31. The first support portion 321 has a circular face 321a and a square face 321b. The circular face 321a is in registry or contact with the outer surface 23a of the horizontal portion 23 of the stay 2. The diameter of the circular face 321a is substantially equal to the diameter of the outer surface 23a. The square face 321b is in contact with the square face 31a of the elastic body member 31, or the square face 321b may be substantially as large as the square face 31a. Thus, the frame 32 can rotate together with the elastic body member 31.

The second support portion 322 has a circular face 322a which is in contact with the outer surface 23a of the horizontal portion 23 of the stay 2. The diameter of the circular face 322a is substantially equal to the diameter of the outer surface 23a.

Figure 5:
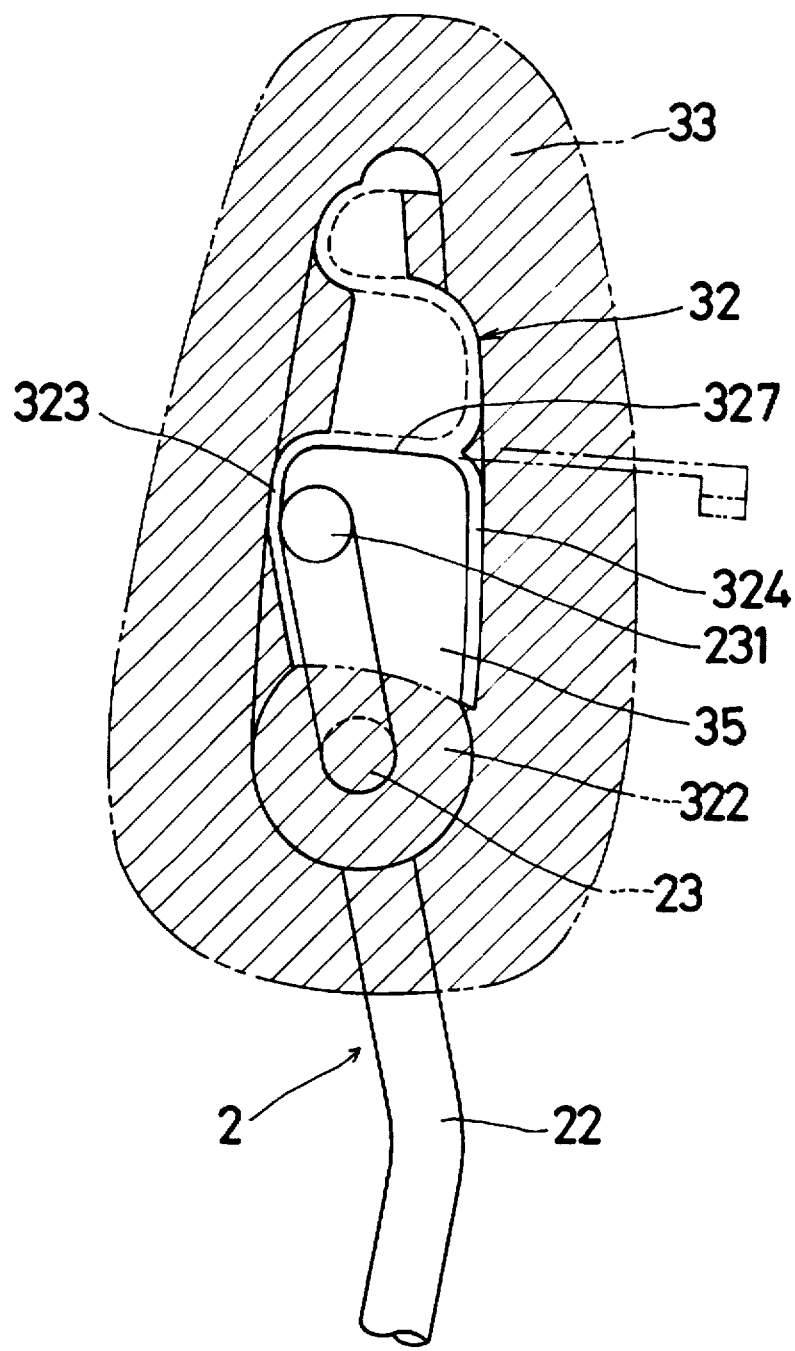
FIG. 5 is a vertical cross-sectional view taken along line 4—4 of the headrest device in FIG. 4, and looking in the direction of the arrows.

A space 35 (as shown in FIG. 5) is formed by the front side of wall 323, the rear side wall 324, the right side wall 325, the left side wall 326, and the top wall 327 which are formed integrally with one another. The extending portion 231 of the horizontal portion 23 of the stay 2 is located in the space 35. A stopper for hindering the rotation of the headrest body 3 relative to the stay 2 comprises the extending portion 231 and the front and rear side walls 323 and 324. The front side wall 323 receives the force added by a passenger.

Figure 4:
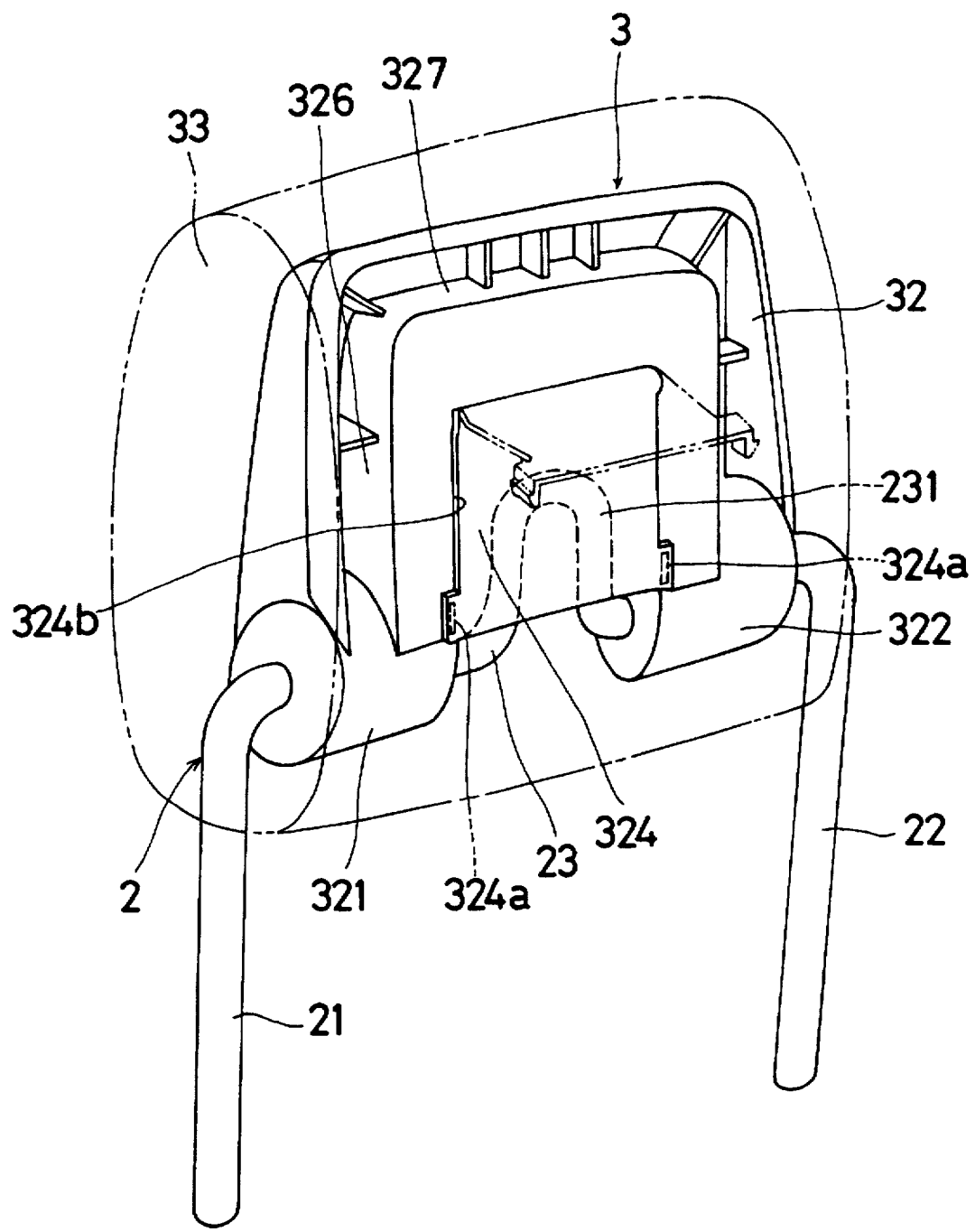
FIG. 4 is a perspective view of the rear portion of the headrest device shown in FIG. 1.

The rear side wall 324 is supported by the top wall 327 so as to swing from a first position as shown by solid lines 329 in FIGS. 4 and 5 to a second position shown by chain lines 331 in FIGS. 4 and 5. If the rear side wall 324 is in the first position, the rear side wall 324 closes an opening 324b which is substantially as large as the rear side wall 324. If the rear side wall 324 is the second position, the rear side wall 324 swings outwardly to open the opening 324b. The rear side wall 324 has a pair of pawl portions 324a, 324a which are in engagement with the right and left side walls 325, 326, respectively when the rear side wall 324 is in the first position closing the opening 324b.

As shown in FIGS. 4 and 5, the pad 33 is made of a urethane foam material and is a cushion of the headrest device 1. The pad 33 is fixed to the frame 32 so as to cover the frame 32.

A method of manufacturing the headrest device 1 is described. A mold release agent is applied to the horizontal portion 23 of the stay 2 on which the projections are formed.

The stay 2 is then placed in a first cavity (not shown) formed in a first mold (not shown). Elastic material is injected into the first cavity, which forms the elastic body member 31 on the stay 2. At the same time the projections 24 form the concaves 34 on the inner face 31b of the elastic body member 31. The mold release agent prevents the elastic material forming the concaves 34 from becoming fixed to the projections 24.

The stay 2, to which the elastic body member 31 is assembled, is placed in a second cavity (not shown) formed in a second mold (not shown). Hard resin material is injected into the second cavity, which forms the frame 32 on the stay 2 and the elastic body member 31. Simultaneously, the circular faces 321a and 322a of the support portions 321 and 322 are formed by the outer surface 23a of the horizontal portion 23, and the rectangular faces 321b of the first support portion 321 are formed by the rectangular faces 31a of the elastic body member 31. At this time, the mold release agent prevents the circular faces 321a and 322a from becoming fixed to the outer surface 23a. The rear side wall 324 of the frame 32, which is formed integrally with the top wall 327, is located in the second position.

The rear side wall 324 is swung from the second position to the first position to close the opening. The pawl portions 324a and 324b of the rear side wall 324 are brought into engagement with the right and left walls 325 and 326, respectively. As a result, the space 35 is closed.

The stay 2 on which the elastic body 31 and the frame 32 are formed is then positioned in a third-cavity (not shown) formed in a third mold (not shown). Foaming urethane material is injected into the third cavity, whereby the pad 33 is formed on the frame 32 so as to cover the frame 32. At this time, since the space 35 is closed, the foaming urethane material is prevented from entering the space 35 while it is being injected into the third cavity. Thus, the headrest device 1 is manufactured.

The operation of the headrest device 1 is now described.

If the head rest body 3 is operated in the foreward and rearward direction, the concaves 34 are elastically deformed, so that the headrest body 3 rotates around the horizontal portion 23 of the stay 2 and relative to the stay 2 until the front side wall 323 or the rear side wall 324 contacts the extending portion 231. At this time, the engagement between the projections 24 and the concaves 34 is adding resistance to the rotation of the headrest body 3 relative to the stay 2. This resistance prevents the unexpected rotation of the headrest body 3. Thus, the position of the headrest device 1 can be adjusted.

In the illustrated embodiment, the resistance adding assembly comprises the projections 24 provided on the horizontal portion 23 of the stay 2, and the concaves 34 which are provided on the elastic body member 31 of the headrest body 3, and are in engagement with the projections 24. Therefore, the resistance adding members can increase the resistance to the rotation of the headrest body 3 relative to the stay 2, to prevent the unexpected rotation of the headrest body 3.

Further, since the resistance adding members comprise the projections 24 and the concaves 34, the concaves 34 can be formed on the elastic body 31 by the projections 24 at the same time the elastic body 31 is formed on the horizontal portion 23 by insert molding. That is to say, the elastic body 31 and the resistance adding member can be assembled to the stay 2 at the same time the elastic body 31 is molded. Therefore, the manufacturing time of the headrest device 1 is much less than that of a conventional headrest device.

The preferred embodiments described herein are therefore illustrative and not restrictive, the scope of the invention being indicated in the appended claims and all variations which come within the meaning of the claims are intended be embraced therein.

What is claimed is:

1. A headrest device comprising:

a stay fixed to a seat back, said stay including a pair of parallel spaced elongate portions connected by a connecting member having a pair of length portions extending perpendicular to the spaced elongate portions and a bent portion disposed between the pair of length portions;

a headrest body rotatably supported by the stay, said headrest body including a stopper portion engageable with the bent portion upon rotation of the headrest body relative to the stay; and rotational resistance generating means disposed between the length portions and the headrest body for generating rotational resistance of the headrest body relative to the stay.

2. A headrest device comprising:

a stay including a rod having a pair of spaced approximately parallel leg portions extending in a lower direction and fixed to a seat back, said rod having a cross portion joining the spaced leg portions, said cross portion having a bent portion extending from a straight portion of the cross portion;

a head rest body rotatably supported by the cross portion at a location spaced from the bent portion, said headrest body including a stopper portion rotatable with the headrest body and positioned opposing the bent portion, said stopper portion being engagable with the opposed bent portion to limit rotation of the headrest body relative said stay; and rotational resistance generating means, located on the cross portion spaced from the bent portion, for generating rotational resistance during the limited rotation of the headrest body relative to the stay.

3. The headrest device of claim 2 wherein the bent portion of the stay is positioned between and spaced from the spaced leg portions, the headrest body is rotatably supported at opposite sides of the bent portion, and the rotational resistance generating means is located between the bent portion and at least one of the leg portions.

* * * * *